(12) United States Patent
Nusser et al.

(10) Patent No.: US 8,357,210 B2
(45) Date of Patent: Jan. 22, 2013

(54) DISAZO ACID DYES

(75) Inventors: Rainer Nusser, Neuenburg (DE); Urs Daetwyler, Gempen (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/099,669

(22) Filed: May 3, 2011

(65) Prior Publication Data
US 2011/0203058 A1    Aug. 25, 2011

Related U.S. Application Data

(63) Continuation of application No. 12/300,709, filed on Nov. 13, 2008, now abandoned.

(30) Foreign Application Priority Data

May 16, 2006  (EP) .................................... 06114058
May 11, 2007  (WO) ................. PCT/EP2007/054581

(51) Int. Cl.
C09B 62/24    (2006.01)
C09B 67/00    (2006.01)
C09D 11/00    (2006.01)

(52) U.S. Cl. ............. 8/687; 8/662; 8/664; 8/665; 8/680; 8/681; 534/573; 534/637; 534/650; 534/816; 534/831; 534/843; 106/31.13; 106/31.43; 106/31.51; 106/31.58; 347/100

(58) Field of Classification Search ............... 8/636–696; 534/573–843; 106/31.13, 31.43, 31.51, 31.58; 347/100
See application file for complete search history.

(56) References Cited

U.S. PATENT DOCUMENTS

| | | | |
|---|---|---|---|
| 2,438,754 A | | 4/1948 | Krebser et al. |
| 3,467,645 A | * | 9/1969 | Grossmann et al. .......... 534/672 |
| 4,051,123 A | | 9/1977 | Piller et al. |
| 4,247,460 A | | 1/1981 | Hugl et al. |
| 4,412,950 A | | 11/1983 | Crounse |
| 4,430,259 A | * | 2/1984 | Mischke et al. .............. 534/642 |
| 4,940,783 A | * | 7/1990 | Stingelin ....................... 534/605 |
| 5,108,460 A | * | 4/1992 | Hines et al. ........................ 8/403 |
| 5,540,739 A | * | 7/1996 | Hannemann et al. ............. 8/552 |
| 5,591,833 A | * | 1/1997 | Hines et al. ................... 534/607 |
| 5,674,299 A | | 10/1997 | Kaser |
| 5,834,602 A | | 11/1998 | Lamm et al. |
| 6,048,968 A | | 4/2000 | Etzbach et al. |
| 6,080,209 A | | 6/2000 | Wiesenfeldt et al. |
| 7,927,384 B2 | | 4/2011 | Nusser |

FOREIGN PATENT DOCUMENTS

| | | |
|---|---|---|
| DE | 2540171 | 3/1977 |
| DE | 19643769 | 4/1998 |
| DE | 19643769 A1 * | 4/1998 |
| EP | 0696619 | 2/1996 |
| EP | 1066340 | 10/1999 |
| EP | 0955342 | 11/1999 |
| WO | WO 99/51681 | 10/1999 |
| WO | WO 02/46318 | 6/2002 |
| WO | WO 2005/113680 | 12/2005 |

OTHER PUBLICATIONS

Ostroverkhov et al. "L-like chromophores for chiral non-linear optical materials." Chem Phys Let. 340, p. 109-115, May 2001.*
Li et al. "Design and synthesis of chromophores used for the main-chain NLO materials." Materials Letters. 60, p. 1116-1121, Nov. 2005.*
PCT International Search Report for PCT/EP 2007/054581, mailed Jun. 12, 2007.
XP 000391883: Chemical Abstracts and Indexes, American Chemical Society, Colombus, US, Apr. 19, 1993.
PCT Written Opinion of the International Searching Authority, Jun. 12, 2007.
"Bisazo disperse dyes derived from 6,6'-bis [3-(3-/4-aminophenyl)-2-methylquinazolin-4(3H)-one] for dyeing nylon, polyester and cellulose triacetate fibres," Indian Journal of Fibre and Textile Research, vol. 17, pp. 144-152, Sep. 1992.
English Abstract for DE 2540171, Mar. 24, 1977.
English Abstract for DE 19643769, Apr. 30, 1998.

* cited by examiner

*Primary Examiner* — Lorna M Douyon
*Assistant Examiner* — Tri V Nguyen
(74) *Attorney, Agent, or Firm* — Anthony A. Bisulca

(57) ABSTRACT

Compounds of the general formula (I)

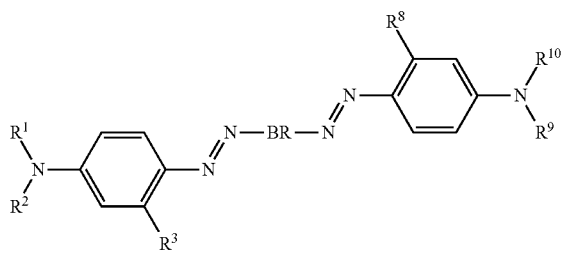

(I)

a process for their preparation and their use for dyeing and/or printing organic substrates.

7 Claims, No Drawings

DISAZO ACID DYES

CROSS REFERENCE TO RELATED APPLICATION

This application is a continuation application of U.S. patent application Ser. No. 12/300,709, filed Nov. 13, 2008, now abandoned, by Nusser et al., the entire disclosure of which is hereby incorporated herein by reference.

The invention relates to novel acid dyes, a process for their preparation and their use for dyeing organic substrates.

Acid dyes are known and dyes with bridging members are known as well. However, there is still a need for acid dyes with improved properties.

The invention provides compounds of the general formula (I)

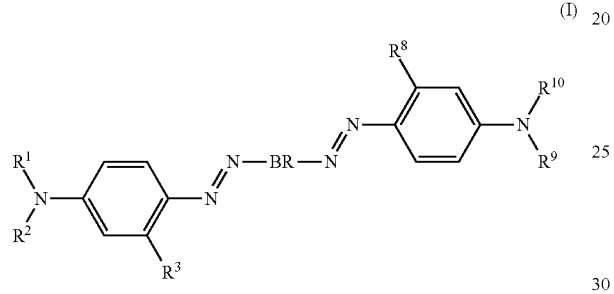

where
- $R^1$, $R^2$, $R^9$ and $R^{10}$ are independently unsubstituted unbranched $C_{1-6}$alkyl or unsubstituted branched $C_{3-6}$alkyl or substituted unbranched $C_{1-6}$alkyl or substituted branched $C_{3-6}$alkyl, or aryl, or —$(CH_2)_p$-aryl where p=1, 2, 3 or 4,
- $R^3$ and $R^8$ is hydrogen, unsubstituted unbranched $C_{1-6}$alkyl or unsubstituted branched $C_{3-6}$alkyl or substituted unbranched $C_{1-6}$alkyl or substituted branched $C_{3-6}$alkyl or unsubstituted unbranched $C_{1-6}$alkoxy or unsubstituted branched $C_{3-6}$alkoxy or substituted unbranched $C_{1-6}$alkoxy or substituted branched $C_{3-6}$alkoxy, or halogen, or —NHCO—($C_{1-6}$alkyl) with an unbranched $C_{1-6}$alkyl group, which is substituted or unsubstituted, or —NHCO—($C_{3-6}$alkyl) with a branched $C_{3-6}$alkyl group, which is substituted or unsubstituted, or —NHCONH$_2$,
- BR is a bridge of the formula -A-B-A- wherein
  - A is substituted phenyl or substituted naphthyl or unsubstituted phenyl or unsubstituted naphthyl, and
  - B is a bridging —$[(CR^6R^7)$—$(CR^{6'}R^{7'})_m$-$(CR^{6''}R^{7''})_n$-$(CR^{6'''}R^{7'''})_o]$-where m, n and o have the meaning of 1 or 0, and $R^6$, $R^7$, $R^{6'}$, $R^{7'}$, $R^{6''}$, $R^{7''}$, $R^{6'''}$ and $R^{7'''}$ are independently hydrogen, unsubstituted unbranched $C_{1-6}$alkyl, substituted unbranched substituted branched $C_{3-6}$alkyl or un substituted branched $C_{3-6}$alkyl, unsubstituted unbranched $C_{1-6}$alkoxy, unsubstituted or substituted phenyl or $R^6$ and $R^7$ together or $R^{6'}$ and $R^{7'}$ together or $R^{6''}$ and $R^{7''}$ together or $R^{6'''}$ $R^{7'''}$ together form a five or six membered aliphatic ring, or
  - B is a bridging sulphon, or B is a bridging sulphonamide or
  - B is a bridging carboxamide or
  - B is a bridging

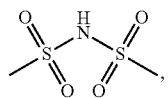

and the compounds of the formula (I) bear 1, 2 or 3 sulpho groups.

In preferred compounds of the general formula (I)
- $R^1$ and $R^9$ are unsubstituted unbranched $C_{1-6}$alkyl or unsubstituted branched $C_{3-6}$alkyl or substituted unbranched $C_{1-6}$alkyl or substituted branched $C_{3-6}$alkyl,
- $R^2$ and $R^{10}$ are aryl, or —$(CH_2)_p$-aryl where p=1, 2, 3, or 4,
- $R^3$ and $R^8$ are hydrogen, unsubstituted unbranched $C_{1-6}$alkyl or unsubstituted branched $C_{3-6}$alkyl or substituted unbranched $C_{1-6}$alkyl or substituted branched $C_{3-6}$alkyl or unsubstituted unbranched $C_{1-6}$alkoxy or unsubstituted branched $C_{3-6}$alkoxy or substituted unbranched $C_{1-6}$alkoxy or substituted branched $C_{3-6}$alkoxy,
- BR is a bridge of the formula -A-B-A- wherein
  - A is substituted phenyl or substituted naphthyl or unsubstituted phenyl or unsubstituted naphthyl, and
  - B is a bridging —$[(CR^6R^7)$—$(CR^{6'}R^{7'})_m$-$(CR^{6''}R^{7''})_n$-$(CR^{6'''}R^{7'''})_o]$-where m, n and o have the meaning of 1 or 0, and $R^6$, $R^7$, $R^{6'}$, $R^{7'}$, $R^{6''}$, $R^{7''}$, $R^{6'''}$ and $R^{7'''}$ are independently hydrogen, unsubstituted unbranched $C_{1-6}$alkyl, substituted unbranched $C_{1-6}$ alkyl, substituted branched $C_{3-6}$alkyl or un substituted branched $C_{3-6}$alkyl, unsubstituted unbranched $C_{1-6}$alkoxy, unsubstituted or substituted phenyl or $R^6$ and $R^7$ together or $R^{6'}$ and $R^{7'}$ together or $R^{6''}$ and $R^{7''}$ together or $R^{6'''}$ and $R^{7'''}$ together form a five or six membered aliphatic ring, or
  - B is a bridging sulphon, or B is a bridging sulphonamide or
  - B is a bridging carboxamide or
  - B is a bridging

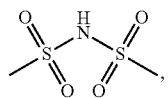

The preferably 1, 2 or 3 sulpho groups are preferably the further substituents or the substituents on the radicals $R^1$, $R^2$, $R^9$ and $R^{10}$. By preference these 1, 2 or 3 sulpho groups are attached to aryl moieties of the radicals $R^1$, $R^2$, $R^9$ and $R^{10}$ if aryl moieties are present in the radicals $R^1$, $R^2$, $R^9$ and $R^{10}$. More preferred these 1, 2 or 3 sulpho groups are located on the radicals $R^2$ and/or $R^{10}$. In the preferred compounds of the formula (I) there are no anionic substituents in the bridge member BR.

The preferred compounds of the formula (I) bear 2 sulpho groups.

Aryl is preferably substituted phenyl or substituted naphthyl or unsubstituted phenyl or unsubstituted naphthyl. The substituted aryl groups are preferably substituted by nitro or sulpho groups. Particular preference is given to sulpho groups as substituents on the aryl groups.

Very particular preference is further given to compounds of the formula (I) wherein $R^2$ and/or $R^{10}$ are substituted or unsubstituted —$(CH_2)_p$-phenyl or substituted or unsubstituted —$(CH_2)_p$-naphthyl where p=1, 2, 3 or 4, preferrably p is 1 or 2 and of which a —$CH_2$-phenyl group is very particularly preferred.

The preferred —CH$_2$-phenylen groups are substituted, preferably by nitro groups and/or sulpho groups, a sulpho group being very particularly preferred as a substituent for the preferred —CH$_2$-phenyl groups.

Particularly preferred —CH$_2$-phenyl groups have the following formula

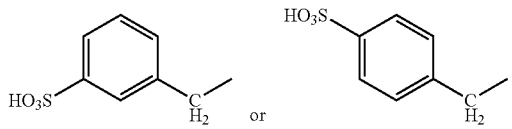

The branched C$_{3-6}$alkyl groups or unbranched C$_{1-6}$alkyl groups and the unbranched C$_{1-6}$alkoxy groups or branched C$_{3-6}$alkoxy groups can be further substituted with hydroxy groups or cyano groups. Preferably the alkyl groups and/or the alkoxy groups are not further substituted.

In the preferred compounds of the formula (I) the preferred alkyl groups and the preferred alkoxy groups are methyl, ethyl, propyl, methoxy and ethoxy groups. Methyl, ethyl and methoxy groups are very particularly preferred.

In the preferred compounds of the formula (I), the particularly preferred bridges have the structures (II-1) or (II-2) or (II-3) or (II-4) or (II-5):

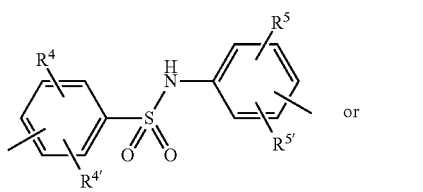
(II-1)

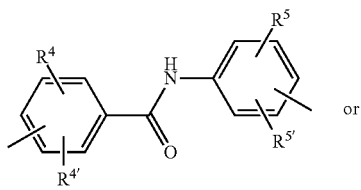
(II-2)

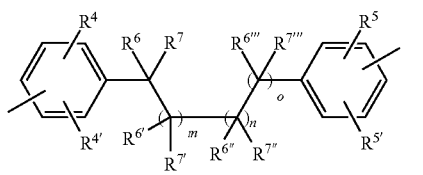
(II-3)

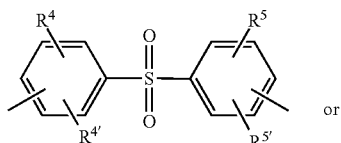
(II-4)

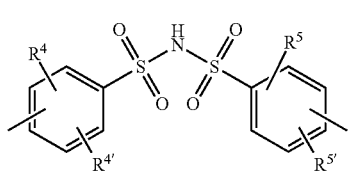
(II-5)

wherein
R$^4$, R$^{4'}$, R$^5$ and R$^{5'}$ are independently hydrogen, unsubstituted unbranched C$_{1-6}$alkyl or unsubstituted branched C$_{3-6}$alkyl or substituted unbranched C$_{1-6}$alkyl or substituted branched C$_{3-6}$alkyl or unsubstituted unbranched C$_{1-6}$alkoxy or unsubstituted branched C$_{3-6}$alkoxy or substituted unbranched C$_{1-6}$alkoxy or substituted branched C$_{3-6}$alkoxy, or halogen or —NHCO—(C$_{3-6}$alkyl) with an unbranched C$_{1-6}$alkyl group, which is substituted or unsubstituted, or —NHCO—(C$_{3-6}$alkyl) with a branched C$_{3-6}$alkyl group, which is substituted or unsubstituted, or —NHCONH$_2$ R$^6$, R$^7$, R$^{6'}$, R$^{7'}$, R$^{6''}$, R$^{7''}$, R$^{6'''}$ and R$^{7'''}$ are independently hydrogen, unsubstituted unbranched C$_{1-6}$alkyl, unsubstituted unbranched C$_{1-6}$alkoxy, unsubstituted or substituted phenyl, or R$^6$ and R$^7$ together or R$^{6'}$ and R$^{7'}$ together or R$^{6''}$ and R$^{7''}$ together or R$^{6'''}$ and R$^{7'''}$ together form a five or six membered aliphatic ring, or m, n and o have the meaning of 1 or 0.

From the bridge structures (II-1) or (II-2) or (II-3) or (II-4), the bridge structure (II-3) are the preferred bridge BR. In the preferred structure (II-3) m is 1, n and o are each 0 and have the following structure (II-3')

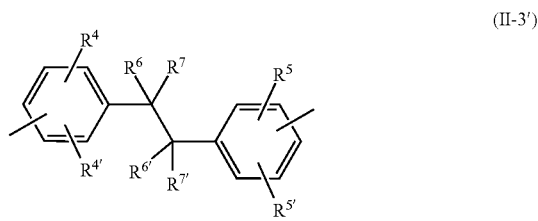
(II-3')

wherein R$^{4'}$, R$^{5'}$, R$^4$, R$^5$, R$^6$, R$^7$, R$^{6'}$ and R$^{7'}$ have the meaning as described above.

Preferably R$^{4'}$ and R$^{5'}$ are hydrogen and R$^4$ and R$^5$ are independently hydrogen, unsubstituted unbranched C$_{1-6}$alkyl or unsubstituted branched C$_{3-6}$alkyl, or substituted unbranched C$_{1-6}$alkyl or substituted branched C$_{3-6}$alkyl or unsubstituted unbranched C$_{1-6}$alkoxy or unsubstituted branched C$_{3-6}$alkoxy or substituted unbranched C$_{1-6}$alkoxy or substituted branched C$_{3-6}$alkoxy. Most preferably R$^{4'}$, R$^{5'}$, R$^4$ and R$^5$ are each hydrogen.

Preferably R$^6$, R$^7$, R$^{6'}$, R$^{7'}$, R$^{6''}$, R$^{7''}$, R$^{6'''}$ and R$^{7'''}$ are independently hydrogen or methyl or ethyl or phenyl. Most preferably R$^6$, R$^7$, R$^{6'}$ and R$^{7'}$ are each hydrogen (and in is 1, n and o are each 0).

The invention also provides a process for preparing compounds of the formula (I). The present invention's compounds of the formula (I) can be prepared under conventional conditions in conventional processes.

In these processes, both the amine functions of compounds of the formula (II)

$$H_2N—BR—NH_2 \quad (II),$$

which are known from the literature are conventionally diazotized and coupled onto totally two equivalents of a compound of the formula (IIIa) and of a compound of the formula (IIIb)

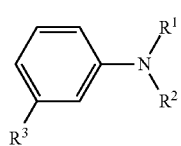
(IIIa)

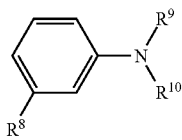

where the substituents are each as defined above an the sum of the compound of the formula (IIIa) and of the compound of the formula (IIIb) is two equivalents.

It should be clear to a person skilled in the art, that the statistical mixture of the different possible compounds will result in such a reaction procedure, wherein the diamin (II) is bis-diazotized and then reacted with the mixture of the compounds of the formulae (IIIa) and (IIIb). Furthermore, in case that one of the components (IIIa) and/or (IIIb) comprises position isomers it should be clear to a person skilled in the art, that this would result as well to the statistical mixture of the additional different possible compounds. As an example, the compound of the formula (IIIa) may consist of a mixture of the compounds (IIIa') and (IIIa"), e.g. 15 weight-% of the compound of the formula (IIIa') and 85 weight-% of the compound of the formula (IIIa")

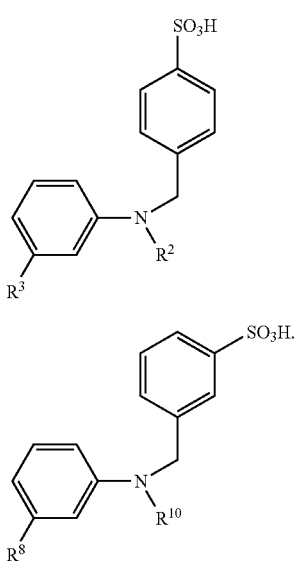

In these processes, the particular diamine is cooled to 0-10° C. or preferably to 0-5° C. and diazotized by adding nitrosylsulphuric acid or sodium nitrite. Afterwards, the bis-diazotized diamine is allowed to react with the compound (IIIa) or with the compound (IIIb), preferably in aqueous solution.

The dyes of the formula (I) can be isolated from the reaction medium by conventional processes, for example by salting out with an alkali metal salt, filtering and drying, if appropriate under reduced pressure and at elevated temperature.

Depending on the reaction and/or isolation conditions, the dyes of the formula (I) can be obtained as free acid, as salt or as mixed salt which contains for example one or more cations selected from alkali metal ions, for example the sodium ion, or an ammonium ion or alkylammonium cation, for example mono-, di- or trimethyl- or -ethylammonium cations. The dye can be converted by conventional techniques from the free acid into a salt or into a mixed salt or vice versa or from one salt form into another. If desired, the dyes can be further purified by diafiltration, in which case unwanted salts and synthesis by-products are separated from the crude anionic dye.

The removal of unwanted salts and synthesis by-products and partial removal of water from the crude dye solution is carried out by means of a semipermeable membrane by applying a pressure whereby the dye is obtained without the unwanted salts and synthesis by-products as a solution and if necessary as a solid body in a conventional manner.

The dyes of the formula (I) and their salts are particularly suitable for dyeing or printing fibrous material consisting of natural or synthetic polyamides in yellow to violet shades. The dyes of the formula (I) and their salts are suitable for producing Inkjet printing inks and for using these Inkjet printing inks to print fibrous material which consists of natural or synthetic polyamides or cellulose (paper for example).

The invention accordingly provides from another aspect for the use of the dyes of the formula (I), their salts and mixtures for dyeing and/or printing fibrous materials consisting of natural or synthetic polyamides. A further aspect is the production of Inkjet printing inks and their use for printing fibrous materials consisting of natural or synthetic polyamides.

Dyeing is carried out as per known processes, see for example the dyeing processes described in Ullmanns Encyklopädie der technischen Chemie, 4th Edition, 1982, Volume 22, pages 658-673 or in the book by M. Peter and H. K. Rouette, Grundlagen der Textilveredlung, 13th Edition, 1989, pages 535-556 and 566-574. Preference is given to dyeing in the exhaust process at a temperature of 30 to 140° C., more preferably 80 to 120° C. and most preferably at a temperature of 80 to 100° C., and at a liquor ratio in the range from 3:1 to 40:1.

The substrate to be dyed can be present in the form of yarn, woven fabric, loop-formingly knitted fabric or carpet for example. Fully fashioned dyeings are even permanently possible on delicate substrates, examples being lambswool, cashmere, alpaca and mohair. The dyes of the invention are particularly useful for dyeing fine-denier fibres (microfibres).

The dyes according to the present invention and their salts are highly compatible with known acid dyes. Accordingly, the dyes of the formula (I), their salts or mixtures can be used alone in a dyeing or printing process or else as a component in a combination shade dyeing or printing composition together with other acid dyes of the same class, i.e. with acid dyes possessing comparable dyeing properties, such as for example fastness properties and exhaustion rates from the dyebath onto the substrate. The dyes of the present invention can be used in particular together with certain other dyes having suitable chromophores. The ratio in which the dyes are present in a combination shade dyeing or printing composition is dictated by the hue to be obtained.

The novel dyes of the formula (I), as stated above, are very useful for dyeing natural and synthetic polyamides, i.e. wool, silk and all nylon types, on each of which dyeings having a high fastness level, especially good light fastness and good wet fastnesses (washing, alkaline perspiration) are obtained. The dyes of the formula (I) and their salts have a high rate of exhaustion. The ability of the dyes of the formula (I) and their salt to build up is likewise very good. On-tone dyeings on the identified substrates are of outstanding quality. All dyeings moreover have a constant hue under artificial light. Furthermore, the fastness to decating and boiling is good.

One decisive advantage of the novel dyes is that they are metal free and provide very level dyeings.

The compounds according to the invention can be used as an individual dye or else, owing to their good compatibility, as a combination element with other dyes of the same class having comparable dyeing properties, for example with regard to general fastnesses, exhaustion value, etc. The combination shade dyeings obtained have similar fastnesses to dyeings with the individual dye.

The invention's dyes of the formula (I) can also be used as red components in trichromatic dyeing or printing. Trichromatic dyeing or printing can utilize all customary and known dyeing and printing processes, such as for example the continuous process, exhaustion process, foam dyeing process and Ink-Jet process.

The composition of the individual dye components in the trichromatic dye mixture used in the process of the invention depends on the desired hue. A brown hue for example preferably utilizes 20-40% by weight of a yellow component, 40-60% by weight of the invention's orange or red component and 10-20% by weight of a blue component.

The orange component, as described above, can consist of a single component or of a mixture of different orange individual components conforming to the formula (I). Preference is given to double and triple combinations.

Particularly preferred blue and/or yellow components are described in WO2002/46318.

In the examples which follow, parts and percentages are by weight and temperatures are reported in degrees Celsius.

PREPARATION EXAMPLE 1

29.1 parts of 3-[(ethylphenylamino)methyl]benzenesulphonic acid were suspended in 200 parts of water and dissolved by adding a small amount of sodium hydroxide solution (approx. 30% strength) at a pH 7-7.5. This solution was then admixed with a bis-diazonium salt solution prepared in a conventional manner from 43.0 parts of 1,2-(4,4'-diamino diphenyl)ethane and 50 parts by volume of 4N sodium nitrite solution at 0-5° C. The pH is held at 7.0-7.5 by metered addition of 15% sodium carbonate solution. After coupling had ended, the resulting dye of the formula

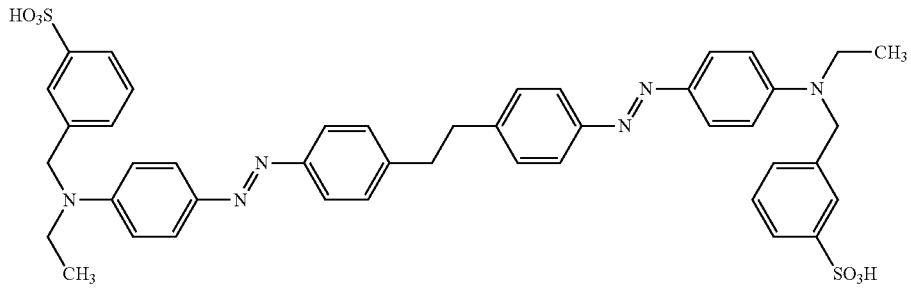 [SMILES: CCN(Cc1cccc(S(=O)(=O)O)c1)c1ccc(/N=N/c2ccc(CCc3ccc(/N=N/c4ccc(N(CC)Cc5cccc(S(=O)(=O)O)c5)cc4)cc3)cc2)cc1]

is salted out with sodium chloride, filtered off and dried at 50° C. under reduced pressure. On wool and in particular on polyamide fibres it produces orange dyeings having very good light and wet fastness properties (lamda(max) ($\lambda_{max}$)= 482 nm).

EXAMPLES 2-28

The tables I and II which follow contain dyes which can be prepared similarly to the method described in Example 1 by using the corresponding starting materials. These dyes provide orange dyeings having very good light and wet fastnesses on polyamide fibres and wool.

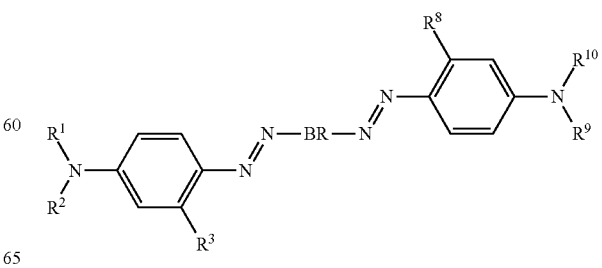

TABLE I

| Example | R¹ and R⁹ | R² and R¹⁰ | R³ and R⁸ | BR | $\lambda_{max}$ [nm] |
|---|---|---|---|---|---|
| 2 | Et | 3-(HO₃S)C₆H₄-CH₂- | Me | 4-Me-C₆H₄-SO₂-NH-C₆H₄-4-Me | 469 |
| 3 | Et | 3-(HO₃S)C₆H₄-CH₂- | H | 4-Me-C₆H₄-SO₂-NH-C₆H₄-4-Me | 467 |
| 4 | Et | 3-(HO₃S)C₆H₄-CH₂- | Me | 4-Me-C₆H₄-C(O)-NH-C₆H₄-4-Me | 488 |
| 5 | Et | 3-(HO₃S)C₆H₄-CH₂- | H | 4-Me-C₆H₄-C(O)-NH-C₆H₄-4-Me | 485 |
| 6 | Et | 3-(HO₃S)C₆H₄-CH₂- | dto. | 4-Me-C₆H₄-C(O)-NH-C₆H₄-3-Me | 465 |
| 7 | Et | 3-(HO₃S)C₆H₄-CH₂- | Me | 4-Me-C₆H₄-C(O)-NH-C₆H₄-3-Me | 470 |
| 8 | Et | 3-(HO₃S)C₆H₄-CH₂- | dto. | 3-Me-C₆H₄-C(O)-NH-C₆H₄-4-Me | 466 |
| 9 | Et | 3-(HO₃S)C₆H₄-CH₂- | H | 3-Me-C₆H₄-C(O)-NH-C₆H₄-4-Me | 462 |
| 10 | Et | 3-(HO₃S)C₆H₄-CH₂- | Me | 3-Me-C₆H₄-C(O)-NH-C₆H₄-3-Me | 458 |
| 11 | Et | 3-(HO₃S)C₆H₄-CH₂- | H | 3-Me-C₆H₄-C(O)-NH-C₆H₄-3-Me | 455 |
| 12 | Et | 4-(HO₃S)C₆H₄-CH₂-CH₂- | dto. | 3-Me-C₆H₄-C(O)-NH-C₆H₄-3-Me | 457 |

TABLE I-continued

| Example | R¹ and R⁹ | R² and R¹⁰ | R³ and R⁸ | BR | $\lambda_{max}$ [nm] |
|---|---|---|---|---|---|
| 13 | Et | 3-HO₃S-C₆H₄- | Me | 3-Me-C₆H₄-C(O)NH-C₆H₄(3-Me)- | 460 |
| 14 | Et | 3-HO₃S-C₆H₄- | dto. | 3-Me-C₆H₄-C(O)NH-C₆H₄(3-Me)- | 462 |
| 15 | Et | 3-HO₃S-C₆H₄- | dto. | 4-Me-C₆H₄-SO₂NH-C₆H₄(4-Me)- | 472 |
| 16 | Et | 3-HO₃S-C₆H₄- | dto. | 4-Me-C₆H₄-CH₂CH₂-C₆H₄(4-Me)- | 483 |
| 17 | Et | 3-HO₃S-C₆H₄- | H | 4-Me-C₆H₄-SO₂NH-C₆H₄(4-Me)- | 475 |
| 18 | n-Pr | 4-HO₃S-C₆H₄- | Me | 4-Me-C₆H₄-C(O)NH-C₆H₄(4-Me)- | 490 |
| 19 | Et | 4-HO₃S-C₆H₄- | H | 4-Me-C₆H₄-C(O)NH-C₆H₄(4-Me)- | 495 |
| 20 | i-Pr | 3-HO₃S-C₆H₄-CH₂- | dto. | 4-Me-C₆H₄-C(O)NH-C₆H₄(4-Me)- | 487 |
| 21 | n-Bu | 3-HO₃S-C₆H₄-CH₂- | Me | 4-Me-C₆H₄-C(O)NH-C₆H₄(4-Me)- | 489 |
| 22 | n-Pr | 3-HO₃S-C₆H₄-CH₂- | dto. | 4-Me-C₆H₄-SO₂NH-C₆H₄(4-Me)- | 478 |
| 23 | n-Pr | 3-HO₃S-C₆H₄-CH₂- | H | 4-Me-C₆H₄-CH₂CH₂-C₆H₄(4-Me)- | 485 |

TABLE I-continued

| Example | R¹ and R⁹ | R² and R¹⁰ | R³ and R⁸ | BR | $\lambda_{max}$ [nm] |
|---|---|---|---|---|---|
| 24 | n-Pr | 4-(HO₃S)C₆H₄-CH₂CH₂- | dto. | 4-CH₃-C₆H₄-CH₂-CH₂-C₆H₄-4- | 483 |
| 25 | Me | 3-(HO₃S)-C₆H₄- | dto. | 4-CH₃-C₆H₄-CH₂-CH₂-C₆H₄-4- | 489 |
| 26 | Me | 3-(HO₃S)-C₆H₄- | Me | 4-CH₃-C₆H₄-C(O)NH-C₆H₄-4- | 495 |
| 27 | n-Bu | 3-(HO₃S)-C₆H₄- | H | 4-CH₃-C₆H₄-C(O)NH-C₆H₄-4- | 492 |
| 28 | n-Bu | 4-(HO₃S)-C₆H₄- | dto. | 4-CH₃-C₆H₄-C(O)NH-C₆H₄-4- | 491 |
| 29 | n-Bu | 4-(HO₃S)-C₆H₄- | Me | 4-CH₃-C₆H₄-C(O)NH-C₆H₄-4- | 494 |
| 30 | n-Bu | 4-(HO₃S)-C₆H₄- | dto. | 4-CH₃-C₆H₄-S(O)₂NH-C₆H₄-4- | 480 |
| 31 | Me | 3-(HO₃S)-C₆H₄-CH(CH₃)- | dto. | 4-CH₃-C₆H₄-S(O)₂NH-C₆H₄-4- | 483 |
| 32 | Me | 3-(HO₃S)-C₆H₄-CH(CH₃)- | dto. | 4-CH₃-C₆H₄-C(O)NH-C₆H₄-3-CH₃ | 467 |
| 33 | Me | 3-(HO₃S)-C₆H₄-CH(CH₃)- | H | 4-CH₃-C₆H₄-C(O)NH-C₆H₃(2-CH₃)(4-) | 485 |

TABLE I-continued
| Example | $R^1$ and $R^9$ | $R^2$ and $R^{10}$ | $R^3$ and $R^8$ | BR | $\lambda_{max}$ [nm] |
|---|---|---|---|---|---|
| 34 | Et | 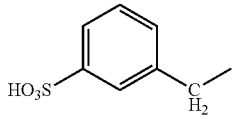 | H | 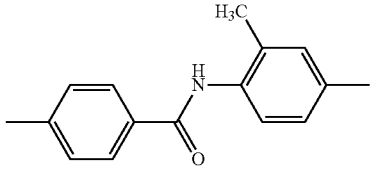 | 487 |
| 35 | n-Pr | 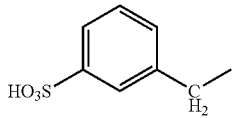 | H | 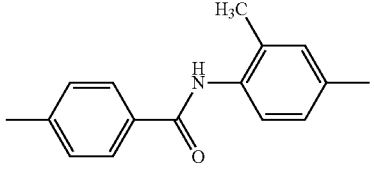 | 487 |
| 36 | i-Pr | 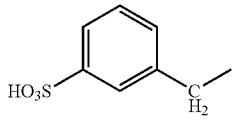 | H | 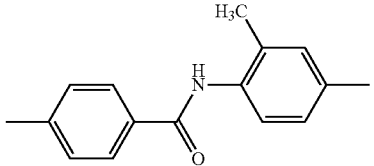 | 488 |
| 37 | n-Bu | 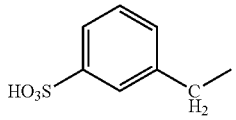 | H | 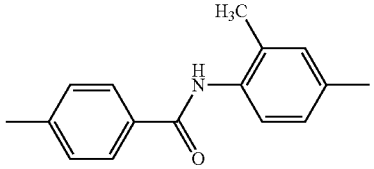 | 490 |
| 38 | Me | 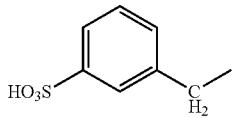 | Me | 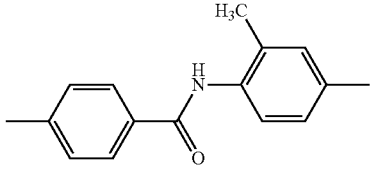 | 489 |
| 39 | Et | 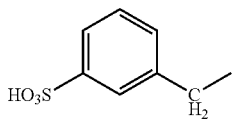 | Me | 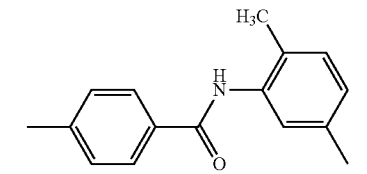 | 486 |
| 40 | n-Pr | 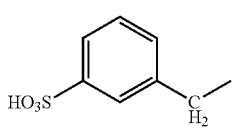 | Me | 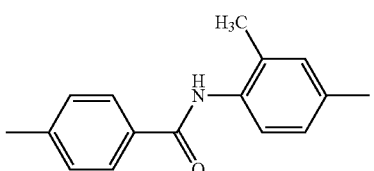 | 488 |
| 41 | i-Pr | 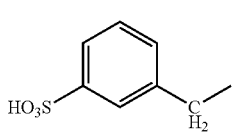 | Me | 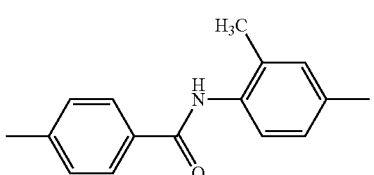 | 487 |

TABLE I-continued

| Example | R¹ and R⁹ | R² and R¹⁰ | R³ and R⁸ | BR | $\lambda_{max}$ [nm] |
|---|---|---|---|---|---|
| 42 | n-Bu | 3-(HO₃S)-C₆H₄-CH₂- | Me | 4-methyl-N-(2-methyl-4-methylphenyl)benzamide | 491 |
| 43 | Me | 3-(HO₃S)-C₆H₄-CH₂- | H | 4-methyl-N-(2-methoxy-4-methylphenyl)benzamide | 510 |
| 44 | Et | 3-(HO₃S)-C₆H₄-CH₂- | H | 4-methyl-N-(2-methoxy-4-methylphenyl)benzamide | 511 |
| 45 | n-Pr | 3-(HO₃S)-C₆H₄-CH₂- | H | 4-methyl-N-(2-methoxy-4-methylphenyl)benzamide | 512 |
| 46 | i-Pr | 3-(HO₃S)-C₆H₄-CH₂- | H | 4-methyl-N-(2-methoxy-4-methylphenyl)benzamide | 512 |
| 47 | n-Bu | 3-(HO₃S)-C₆H₄-CH₂- | H | 4-methyl-N-(2-methoxy-4-methylphenyl)benzamide | 514 |
| 48 | Me | 3-(HO₃S)-C₆H₄-CH₂- | Me | 4-methyl-N-(2-methoxy-4-methylphenyl)benzamide | 512 |
| 49 | Et | 3-(HO₃S)-C₆H₄-CH₂- | Me | 4-methyl-N-(2-methoxy-4-methylphenyl)benzamide | 514 |

TABLE I-continued

| Example | R¹ and R⁹ | R² and R¹⁰ | R³ and R⁸ | BR | $\lambda_{max}$ [nm] |
|---|---|---|---|---|---|
| 50 | n-Pr | 3-(HO₃S)-C₆H₄-CH₂- | Me | 4-Me-C₆H₄-C(O)NH-(2-OMe-4-Me-C₆H₃) | 516 |
| 51 | i-Pr | 3-(HO₃S)-C₆H₄-CH₂- | Me | 4-Me-C₆H₄-C(O)NH-(2-OMe-4-Me-C₆H₃) | 515 |
| 52 | n-Bu | 3-(HO₃S)-C₆H₄-CH₂- | Me | 4-Me-C₆H₄-C(O)NH-(2-OMe-4-Me-C₆H₃) | 517 |
| 53 | Me | 3-(HO₃S)-C₆H₄-CH₂- | H | 4-Me-C₆H₄-C(O)NH-(2,4,5-triMe-C₆H₂) | 520 |
| 54 | Et | 3-(HO₃S)-C₆H₄-CH₂- | H | 4-Me-C₆H₄-C(O)NH-(2,4,5-triMe-C₆H₂) | 523 |
| 55 | n-Pr | 3-(HO₃S)-C₆H₄-CH₂- | H | 4-Me-C₆H₄-C(O)NH-(2,4,5-triMe-C₆H₂) | 524 |
| 56 | i-Pr | 3-(HO₃S)-C₆H₄-CH₂- | H | 4-Me-C₆H₄-C(O)NH-(2,4,5-triMe-C₆H₂) | 524 |
| 57 | n-Bu | 3-(HO₃S)-C₆H₄-CH₂- | H | 4-Me-C₆H₄-C(O)NH-(2,4,5-triMe-C₆H₂) | 526 |

TABLE I-continued
| Example | R¹ and R⁹ | R² and R¹⁰ | R³ and R⁸ | BR | $\lambda_{max}$ [nm] |
|---|---|---|---|---|---|
| 58 | Me | 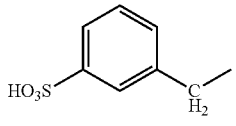 | Me | 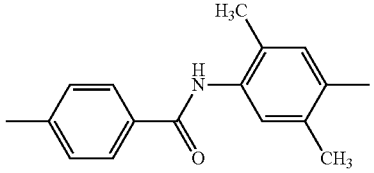 | 524 |
| 59 | Et | 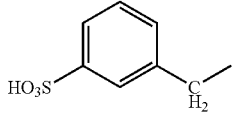 | Me | 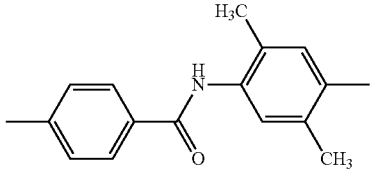 | 525 |
| 60 | n-Pr | 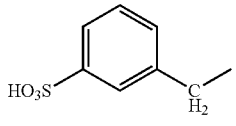 | Me | 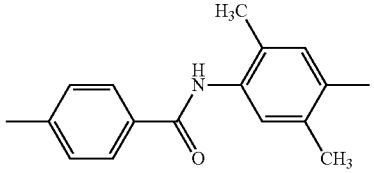 | 527 |
| 61 | i-Pr | 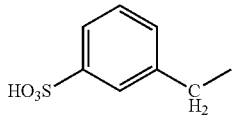 | Me | 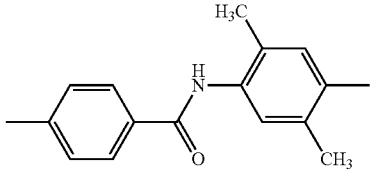 | 527 |
| 62 | n-Bu | 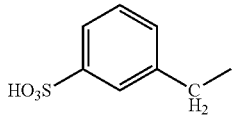 | Me | 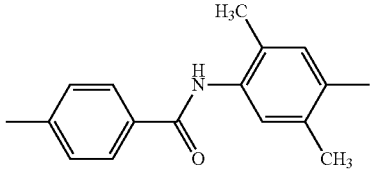 | 528 |
| 63 | Me | 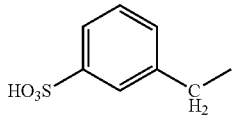 | H | 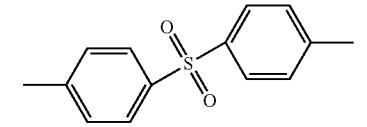 | 515 |
| 64 | Et | 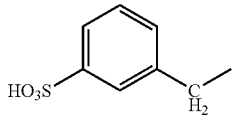 | H | 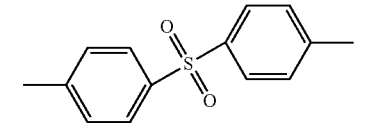 | 517 |
| 65 | n-Pr | 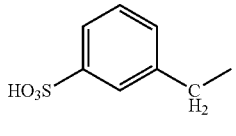 | H | 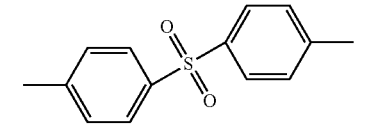 | 519 |
| 66 | i-Pr | 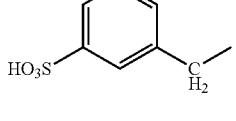 | H | 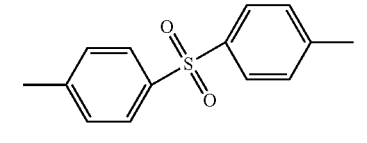 | 520 |

TABLE I-continued

| Example | R¹ and R⁹ | R² and R¹⁰ | R³ and R⁸ | BR | $\lambda_{max}$ [nm] |
|---|---|---|---|---|---|
| 67 | n-Bu | 3-(HO₃S)C₆H₄-CH₂- | H | 4-MeC₆H₄-SO₂-C₆H₄-4-Me | 520 |
| 68 | Me | 3-(HO₃S)C₆H₄-CH₂- | Me | 4-MeC₆H₄-SO₂-C₆H₄-4-Me | 518 |
| 69 | Et | 3-(HO₃S)C₆H₄-CH₂- | Me | 4-MeC₆H₄-SO₂-C₆H₄-4-Me | 519 |
| 70 | n-Pr | 3-(HO₃S)C₆H₄-CH₂- | Me | 4-MeC₆H₄-SO₂-C₆H₄-4-Me | 519 |
| 71 | i-Pr | 3-(HO₃S)C₆H₄-CH₂- | Me | 4-MeC₆H₄-SO₂-C₆H₄-4-Me | 522 |
| 72 | n-Bu | 3-(HO₃S)C₆H₄-CH₂- | Me | 4-MeC₆H₄-SO₂-C₆H₄-4-Me | 526 |
| 73 | Me | 3-(HO₃S)C₆H₄-CH₂- | H | 3-MeC₆H₄-SO₂-C₆H₄-3-Me | 488 |
| 74 | Et | 3-(HO₃S)C₆H₄-CH₂- | H | 3-MeC₆H₄-SO₂-C₆H₄-3-Me | 486 |
| 75 | n-Pr | 3-(HO₃S)C₆H₄-CH₂- | H | 3-MeC₆H₄-SO₂-C₆H₄-3-Me | 489 |

TABLE I-continued

| Example | R¹ and R⁹ | R² and R¹⁰ | R³ and R⁸ | BR | $\lambda_{max}$ [nm] |
|---|---|---|---|---|---|
| 76 | i-Pr | 3-(HO₃S)C₆H₄CH₂– | H | bis(3-methylphenyl)sulfone | 487 |
| 77 | n-Bu | 3-(HO₃S)C₆H₄CH₂– | H | bis(3-methylphenyl)sulfone | 489 |
| 78 | Me | 3-(HO₃S)C₆H₄CH₂– | Me | bis(3-methylphenyl)sulfone | 485 |
| 79 | Et | 3-(HO₃S)C₆H₄CH₂– | Me | bis(3-methylphenyl)sulfone | 486 |
| 80 | n-Pr | 3-(HO₃S)C₆H₄CH₂– | Me | bis(3-methylphenyl)sulfone | 487 |
| 81 | i-Pr | 3-(HO₃S)C₆H₄CH₂– | Me | bis(3-methylphenyl)sulfone | 487 |
| 82 | n-Bu | 3-(HO₃S)C₆H₄CH₂– | Me | bis(3-methylphenyl)sulfone | 489 |

TABLE I-continued
| Example | R¹ and R⁹ | R² and R¹⁰ | R³ and R⁸ | BR | λ$_{max}$ [nm] |
|---|---|---|---|---|---|
| 83 | Me | 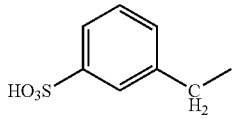 | H | 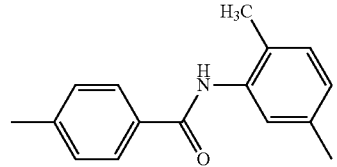 | 505 |
| 84 | Et | 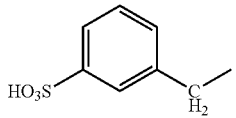 | H | 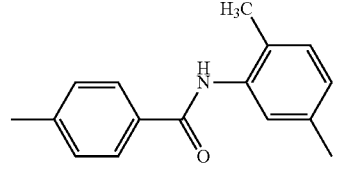 | 507 |
| 85 | n-Pr | 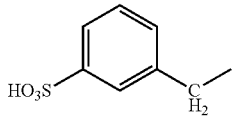 | H | 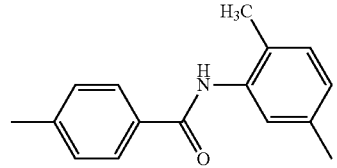 | 509 |
| 86 | i-Pr | 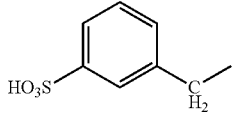 | H | 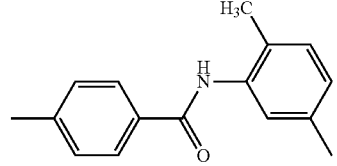 | 509 |
| 87 | n-Bu | 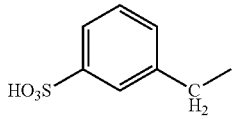 | H | 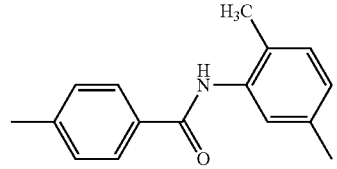 | 511 |
| 88 | Me | 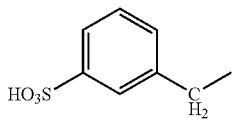 | Me | 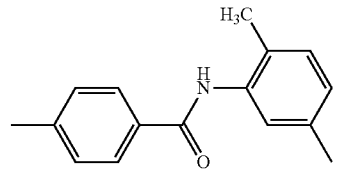 | 508 |
| 89 | Et | 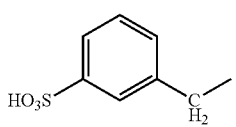 | Me | 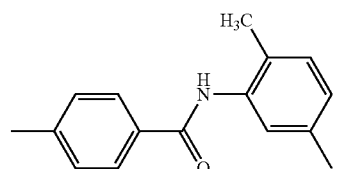 | 508 |
| 90 | n-Pr | 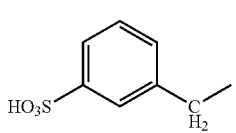 | Me | 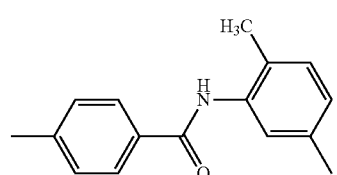 | 510 |

TABLE I-continued

| Example | R¹ and R⁹ | R² and R¹⁰ | R³ and R⁸ | BR | $\lambda_{max}$ [nm] |
|---|---|---|---|---|---|
| 91 | i-Pr | 3-(HO₃S)C₆H₄-CH₂- | Me | 4-MeC₆H₄-C(O)NH-(2,5-diMe-C₆H₃) | 509 |
| 92 | n-Bu | 3-(HO₃S)C₆H₄-CH₂- | Me | 4-MeC₆H₄-C(O)NH-(2,5-diMe-C₆H₃) | 512 |
| 93 | Et | 3-(HO₃S)C₆H₄-CH₂- | Me | (4-MeC₆H₄SO₂)₂NH | 493 |
| 94 | Et | 3-(HO₃S)C₆H₄-CH₂- | H | (4-MeC₆H₄SO₂)₂NH | 490 |
| 95 | Et | 3-(HO₃S)C₆H₄-CH₂- | H | bis(4-MeC₆H₄)CH-CH(Et)(n-C₄H₉) | 483 |
| 96 | Et | 3-(HO₃S)C₆H₄-CH₂- | H | bis(4-MeC₆H₄)CH-CH(Et)(n-C₄H₉) | 485 |
| 97 | Et | 3-(HO₃S)C₆H₄-CH₂- | H | bis(4-MeC₆H₄)CH-CH(Et)₂ | 482 |
| 98 | Et | 3-(HO₃S)C₆H₄-CH₂- | H | bis(4-MeC₆H₄)C(CH₃)₂ | 482 |
| 99 | Et | 3-(HO₃S)C₆H₄-CH₂- | H | 1,1-bis(4-MeC₆H₄)cyclohexane | 484 |

TABLE I-continued
| Example | R¹ and R⁹ | R² and R¹⁰ | R³ and R⁸ | BR | $\lambda_{max}$ [nm] |
|---|---|---|---|---|---|
| 100 | Et | 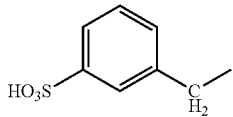 | Me | 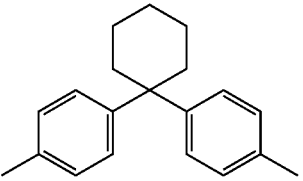 | 486 |
| 101 | Et | 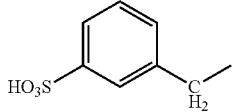 | H | 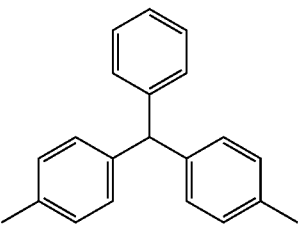 | 480 |
| 102 | Et | 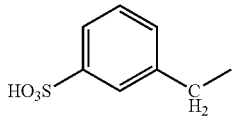 | Me | 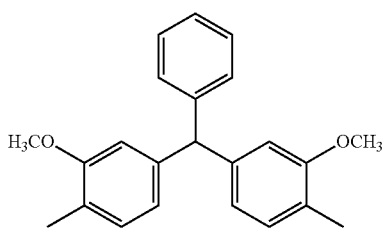 | 523 |
| 103 | Et | 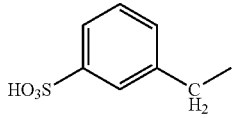 | Me | 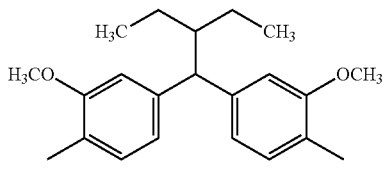 | 525 |
| 104 | Et | 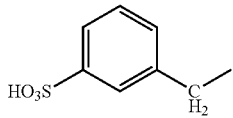 | Me | 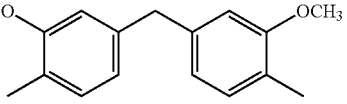 | 520 |
| 105 | Et | 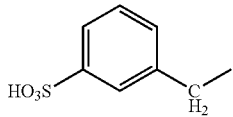 | Me | 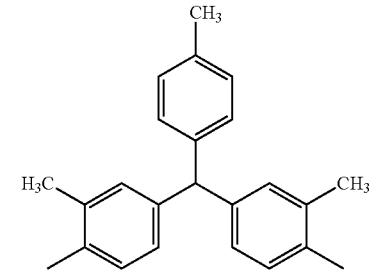 | 522 |
| 106 | Et | 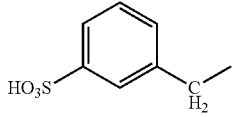 | Me | 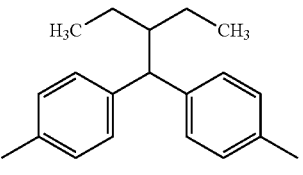 | 487 |
| 107 | Et | 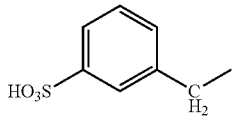 | Me | 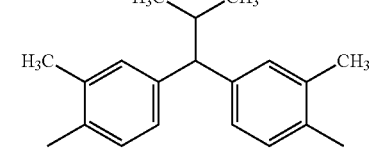 | 524 |

TABLE I-continued

| Example | R¹ and R⁹ | R² and R¹⁰ | R³ and R⁸ | BR | $\lambda_{max}$ [nm] |
|---|---|---|---|---|---|
| 108 | Et | 3-HO₃S-C₆H₄-CH₂- | H | (CH₃)₂CH-bis(3,4-dimethylphenyl) | 520 |
| 109 | Et | 3-HO₃S-C₆H₄-CH₂- | H | CH₃CH-bis(4-methylphenyl) | 483 |
| 110 | Et | 3-HO₃S-C₆H₄-CH₂- | Me | CH₃CH-bis(4-methylphenyl) | 485 |
| 111 | Et | 3-HO₃S-C₆H₄-CH₂- | Me | (CH₃)₂CH-bis(4-methylphenyl) | 486 |
| 112 | Et | 3-HO₃S-C₆H₄-CH₂- | H | (CH₃)₂CH-bis(4-methylphenyl) | 483 |

TABLE II

| Example | R¹ | R² | R³ | BR | R⁸ | R⁹ | R¹⁰ | $\lambda_{max}$ [nm] |
|---|---|---|---|---|---|---|---|---|
| 113 | Et | 3-HO₃S-C₆H₄-CH₂- | Me | bis(4-methylphenyl)sulfone | Me | Et | 4-HO₃S-C₆H₄-CH₂- | 519 |
| 114 | Et | 3-HO₃S-C₆H₄-CH₂- | Me | bis(3-methylphenyl)sulfone | Me | Et | 4-HO₃S-C₆H₄-CH₂- | 487 |
| 115 | Et | 4-HO₃S-C₆H₄-CH₂- | Me | bis(3-methylphenyl)sulfone | Me | Et | 4-HO₃S-C₆H₄-CH₂- | 489 |

TABLE II-continued

| Example | R¹ | R² | R³ | BR | R⁸ | R⁹ | R¹⁰ | $\lambda_{max}$ [nm] |
|---|---|---|---|---|---|---|---|---|
| 117 | Et | 4-HO₃S-C₆H₄-CH₂- | Me | 4-Me-C₆H₄-SO₂-C₆H₄-4-yl | Me | Et | 4-HO₃S-C₆H₄-CH₂- | 522 |
| 118 | Et | 3-HO₃S-C₆H₄-CH₂- | H | 4-Me-C₆H₄-SO₂-C₆H₄-4-yl | H | Et | 4-HO₃S-C₆H₄-CH₂- | 520 |
| 119 | Et | 3-HO₃S-C₆H₄-CH₂- | H | 3-Me-C₆H₄-SO₂-C₆H₄-3-yl | H | Et | 4-HO₃S-C₆H₄-CH₂- | 490 |
| 120 | Et | 4-HO₃S-C₆H₄-CH₂- | H | 4-Me-C₆H₄-SO₂-C₆H₄-4-yl | H | Et | 4-HO₃S-C₆H₄-CH₂- | 523 |
| 121 | Et | 4-HO₃S-C₆H₄-CH₂- | H | 3-Me-C₆H₄-SO₂-C₆H₄-3-yl | H | Et | 4-HO₃S-C₆H₄-CH₂- | 493 |
| 122 | Et | 4-HO₃S-C₆H₄-CH₂- | Me | 4-Me-C₆H₄-CH₂CH₂-C₆H₄-4-yl | Me | Et | 4-HO₃S-C₆H₄-CH₂- | 485 |
| 123 | Et | 3-HO₃S-C₆H₄-CH₂- | Me | 4-Me-C₆H₄-CH₂CH₂-C₆H₄-4-yl | Me | Et | 4-HO₃S-C₆H₄-CH₂- | 483 |
| 124 | Et | 3-HO₃S-C₆H₄-CH₂- | Me | 4-Me-C₆H₄-C(O)NH-C₆H₄-4-yl | Me | Et | 4-HO₃S-C₆H₄-CH₂- | 496 |
| 125 | Et | 4-HO₃S-C₆H₄-CH₂- | Me | 4-Me-C₆H₄-C(O)NH-C₆H₄-4-yl | Me | Et | 3-HO₃S-C₆H₄-CH₂- | 496 |
| 126 | Et | 3-HO₃S-C₆H₄-CH₂- | H | 4-Me-C₆H₄-C(O)NH-C₆H₄-4-yl | H | Et | 4-HO₃S-C₆H₄-CH₂- | 494 |

TABLE II-continued

| Example | R¹ | R² | R³ | BR | R⁸ | R⁹ | R¹⁰ | $\lambda_{max}$ [nm] |
|---|---|---|---|---|---|---|---|---|
| 127 | Et | 4-(HO₃S)-C₆H₄-CH₂- | H | 4-MeC₆H₄-C(O)NH-(4-MeC₆H₄)- | H | Et | 3-(HO₃S)-C₆H₄-CH₂- | 494 |
| 128 | Et | 4-(HO₃S)-C₆H₄-CH₂- | Me | 4-MeC₆H₄-C(O)NH-(2,4,5-Me₃C₆H₂)- | Me | Et | 4-(HO₃S)-C₆H₄-CH₂- | 528 |
| 129 | n-Pr | 4-(HO₃S)-C₆H₄-CH₂- | Me | 4-MeC₆H₄-C(O)NH-(2,4,5-Me₃C₆H₂)- | Me | n-Pr | 4-(HO₃S)-C₆H₄-CH₂- | 530 |
| 130 | Et | 4-(HO₃S)-C₆H₄-CH₂- | Me | 4-MeC₆H₄-C(O)NH-(2,4,5-Me₃C₆H₂)- | Me | Et | 3-(HO₃S)-C₆H₄-CH₂- | 528 |
| 131 | Et | 4-(HO₃S)-C₆H₄-CH₂- | Me | 4-MeC₆H₄-C(O)NH-(3-MeC₆H₄)- | Me | Et | 3-(HO₃S)-C₆H₄-CH₂- | 489 |
| 132 | Et | 3-(HO₃S)-C₆H₄-CH₂- | Me | 1,1-bis(4-MeC₆H₄)cyclohexyl | Me | Et | 4-(HO₃S)-C₆H₄-CH₂- | 486 |
| 133 | Et | 3-(HO₃S)-C₆H₄-CH₂- | H | 1,1-bis(4-MeC₆H₄)cyclohexyl | H | Et | 4-(HO₃S)-C₆H₄-CH₂- | 484 |
| 134 | Et | 3-(HO₃S)-C₆H₄-CH₂- | H | 2-ethylhexyl-bis(4-MeC₆H₄)methyl | H | Et | 4-(HO₃S)-C₆H₄-CH₂- | 483 |
| 135 | Et | 3-(HO₃S)-C₆H₄-CH₂- | Me | 2-ethylhexyl-bis(4-MeC₆H₄)methyl | Me | Et | 4-(HO₃S)-C₆H₄-CH₂- | 485 |

TABLE II-continued

| Example | R¹ | R² | R³ | BR | R⁸ | R⁹ | R¹⁰ | $\lambda_{max}$ [nm] |
|---|---|---|---|---|---|---|---|---|
| 136 | H | 3-(HO₃S)-C₆H₄-CH₂- | H | CH(C₆H₅)(4-MeC₆H₄)₂ | H | Et | 4-(HO₃S)-C₆H₄-CH₂- | 480 |
| 137 | Et | 3-(HO₃S)-C₆H₄-CH₂- | Me | CH(C₆H₅)(2-MeO-4-Me-C₆H₃)₂ | Me | Et | 4-(HO₃S)-C₆H₄-CH₂- | 523 |
| 138 | Et | 3-(HO₃S)-C₆H₄-CH₂- |  | CH(CH₂CH(CH₃)₂)(4-MeC₆H₄)₂ |  | Et | 4-(HO₃S)-C₆H₄-CH₂- | 488 |
| 139 | Et | 3-(HO₃S)-C₆H₄-CH₂- | Me | CH₂-bis(2-MeO-4-Me-C₆H₃) | Me | Et | 4-(HO₃S)-C₆H₄-CH₂- | 520 |
| 140 | Et | 3-(HO₃S)-C₆H₄-CH₂- | Me | (4-MeC₆H₄SO₂)₂NH | Me | Et | 4-(HO₃S)-C₆H₄-CH₂- | 494 |

USE EXAMPLE A

A dyebath at 40° C., consisting of 2000 parts of water, 1 part of a weakly cation-active levelling agent which is based on an ethoxylated aminopropyl fatty acid amide and which has affinity for dye, 0.25 part of the dye of Preparation Example 1 and adjusted to pH 5 with 1-2 parts of 40% acetic acid is entered with 100 parts of nylon-6 fabric. After 10 minutes at 40° C., the dyebath is heated to 98° C. at a rate of 1° C. per minute and then left at the boil for 45-60 minutes. Thereafter it is cooled down to 70° C. over 15 minutes. The dyeing is removed from the bath, rinsed with hot and then with cold water and dried. The result obtained is an orange polyamide dyeing possessing good light and wet fastnesses.

USE EXAMPLE B

A dyebath at 40° C., consisting of 2000 parts of water, 1 part of a weakly cation-active levelling agent which is based on an ethoxylated aminopropyl fatty acid amide and which has affinity for dye, 0.3 part of the dye of Preparation Example 1 and adjusted to pH 5.5 with 1-2 parts of 40% acetic acid is entered with 100 parts of nylon-6,6 fabric. After 10 minutes at 40° C., the dyebath is heated to 120° C. at a rate of 1.5° C. per minute and then left at this temperature for 15-25 minutes. Thereafter it is cooled down to 70° C. over 25 minutes. The dyeing is removed from the dyebath, rinsed with hot and then with cold water and dried. The result obtained is an orange polyamide dyeing with good levelness and having good light and wet fastnesses.

USE EXAMPLE C

A dyebath at 40° C., consisting of 4000 parts of water, 1 part of a weakly amphoteric levelling agent which is based on a sulphated, ethoxylated fatty acid amide and which has affinity for dye, 0.4 part of the dye of Preparation Example 1 and adjusted to pH 5 with 1-2 parts of 40% acetic acid is entered with 100 parts of wool fabric. After 10 minutes at 40° C., the dyebath is heated to boiling at a rate of 1° C. per minute and then left at the boil for 40-60 minutes. Thereafter it is cooled down to 70° C. over 20 minutes. The dyeing is removed from the bath, rinsed with hot and then with cold water and dried. The result obtained is an orange wool dyeing possessing good light and wet fastnesses.

USE EXAMPLE D 100 parts of a woven nylon-6 material are padded with a 50° C. liquor consisting of

| | |
|---|---|
| 40 parts | of the dye of Preparation Example 1, |
| 100 parts | of urea, |
| 20 parts | of a nonionic solubilizer based on butyldiglycol, | dye, 0.2 part of the dye of Example 1, 1.5 parts of a commercially available preparation of C.I. Acid Yellow 236 (Nylosan Yellow F-L) and 0.5 part of the blue dye of Preparation Example 46 of the patent application WO99/51681 and EP1066340 B1:

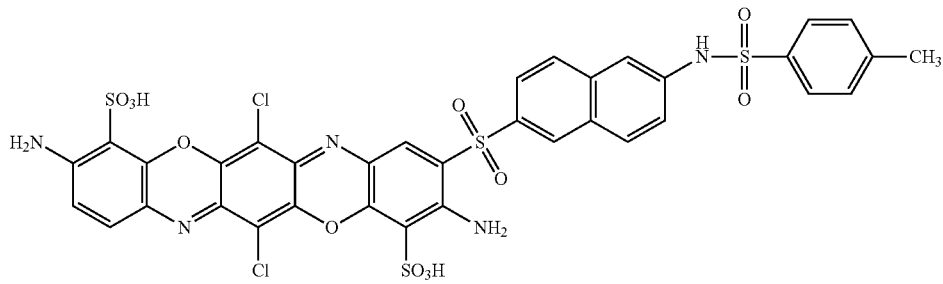 [SMILES: Cc1ccc(S(=O)(=O)Nc2ccc3cc(S(=O)(=O)c4cc5c(c(S(=O)(=O)O)c4N)Oc4c(Cl)c6c(c(Cl)c4=N5)Oc4c(ccc(N)c4S(=O)(=O)O)N=6)ccc3c2)cc1]

-continued

| | |
|---|---|
| 15-20 parts | of acetic acid (to adjust the pH to 4), |
| 10 parts | of a weakly cation-active levelling agent which is based on an ethoxylated aminopropyl fatty acid amide and has affinity for dye, and |
| 810-815 parts | of water (to make up to 1000 parts of padding liquor). |

The material thus impregnated is rolled up and left to dwell in a steaming chamber under saturated steam conditions at 85-98° C. for 3-6 hours for fixation. The dyeing is then rinsed with hot and cold water and dried. The result obtained is an orange nylon dyeing having good levelness in the piece and good light and wet fastnesses.

USE EXAMPLE E

A textile cut pile sheet material composed of nylon-6 and having a synthetic base fabric is padded with a liquor containing per 1000 parts

| | |
|---|---|
| 1 | part of dye of Preparation Example 1 |
| 4 | parts of a commercially available thickener based on carob flour ether |
| 2 | parts of a nonionic ethylene oxide adduct of a higher alkylphenol |
| 1 | part of 60% acetic acid. |

This is followed by printing with a paste which per 1000 parts contains the following components:

| | |
|---|---|
| 20 | parts of commercially available alkoxylated fatty alkylamine (displace product) |
| 20 | parts of a commercially available thickener based on carob flour ether. |

The print is fixed for 6 minutes in saturated steam at 100° C., rinsed and dried. The result obtained is a level-coloured cover material having an orange and white pattern.

USE EXAMPLE F

A dyebath at 40° C. consisting of 2000 parts of water, 1 part of a weakly cation-active levelling agent which is based on an ethoxylated aminopropyl fatty acid amide and has affinity for dye, 0.2 part of the dye of Example 1, 1.5 parts of a commercially available preparation of C.I. Acid Yellow 236 (Nylosan Yellow F-L) and 0.5 part of the blue dye of Preparation Example 46 of the patent application WO99/51681 and EP1066340 B1, which is adjusted to pH 5 with 1-2 parts of 40% acetic acid is entered with 100 parts of woven nylon-6,6 fabric. After 10 minutes at 40° C., the dyebath is heated to 98° C. at a rate of 1° C. per minute and then left at the boil for 45 to 60 minutes. This is followed by cooling down to 70° C. over 15 minutes. The dyeing is removed from the bath, rinsed with hot and then with cold water and dried. The result obtained is a level grey polyamide dyeing having good light and wet fastnesses.

USE EXAMPLE G 100 parts of a chrome-tanned and synthetically retanned shave-moist grain leather are dyed for 30 minutes in a bath of 300 parts of water and 2 parts of the dye of Preparation Example 1 at 55° C. After addition of 4 parts of a 60% emulsion of a sulphited fish oil, the leather is fatliquored for 45 minutes. It is then acidified with 8.5% formic acid and milled for 10 minutes (final pH in the bath 3.5-4.0). The leather is then rinsed, allowed to drip dry and finished as usual. The result obtained is a leather dyed in a level clear orange hue with good fastnesses.

Use Examples A to G can also be carried out with dyes 2 to 140 with similar results.

USE EXAMPLE H 3 parts of the dye of Preparation Example 3 are dissolved in 82 parts of demineralized water and 15 parts of diethylene glycol at 60° C. Cooling down to room temperature gives an orange printing ink which is very highly suitable for ink jet printing on paper or polyamide and wool textiles.

Use Example H can also be carried out with dyes 1 or 2 and 4 to 140 with similar results.

USE EXAMPLE I

A dyebath consisting of 1000 parts of water, 80 parts of calcined Glauber salt, 1 part of sodium nitrobenzene-3-sulphonate and 1 part of dye from Example 79 is heated to 80° C. in the course of 10 minutes. Then, 100 parts of mercerized cotton are added. This is followed by dyeing at 80° C. for 5 minutes and then heating to 95° C. in the course of 15 minutes. After 10 minutes at 95° C., 3 parts of sodium carbonate are added, followed by a further 7 parts of sodium carbonate after 20 minutes and another 10 parts of sodium carbonate after 30 minutes at 95° C. Dyeing is subsequently continued at 95° C. for 60 minutes. The dyed material is then removed from the dyebath and rinsed in running demineralized water for 3 minutes. This is followed by two washes for 10 minutes in 5000 parts of boiling demineralized water at a time and subsequent rinsing in running demineralized water at 60° C. for 3 minutes and with cold tap water for one minute. Drying leaves a brilliant orange cotton dyeing having good fastnesses.

USE EXAMPLE J 0.2 part of the dye of Preparation Example 1 is dissolved in 100 parts of hot water and the solution is cooled down to room temperature. This solution is added to 100 parts of chemically bleached sulphite pulp beaten in 2000 parts of water in a Hollander. After 15 minutes of commixing the stuff is sized with resin size and aluminium sulphate in a conventional manner Paper produced from this stuff has an orange shade with good wet fastnesses.

Use Examples I and J can also be carried out with dyes 1 to 140 with similar results.

The invention claimed is:

1. A compound of the general formula (I)

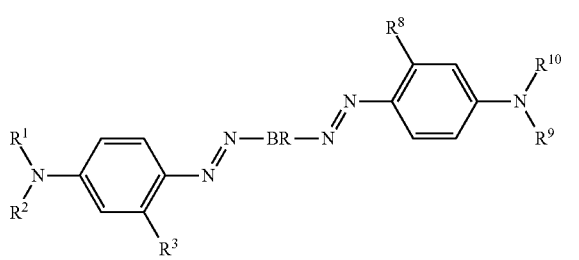

(I)

wherein
$R^1$, $R^2$, $R^9$ and $R^{10}$ are independently selected from the group consisting of: unsubstituted unbranched $C_{1-6}$alkyl, unsubstituted branched $C_{3-6}$alkyl, substituted unbranched $C_{1-6}$alkyl, substituted branched $C_{3-6}$alkyl, aryl, and —$(CH_2)_p$-aryl wherein p=1, 2, 3 or 4,
$R^3$ and $R^8$ is selected from the group consisting of: hydrogen, unsubstituted unbranched $C_{1-6}$alkyl, unsubstituted branched $C_{3-6}$alkyl, substituted unbranched $C_{1-6}$alkyl, substituted branched $C_{3-6}$alkyl, unsubstituted unbranched $C_{1-6}$alkoxy, unsubstituted branched $C_{3-6}$alkoxy, substituted unbranched $C_{1-6}$alkoxy, substituted branched $C_{3-6}$alkoxy, halogen, —NHCO—($C_{1-6}$alkyl) with an unbranched $C_{1-6}$alkyl group, which is substituted or unsubstituted, —NHCO—($C_{3-6}$alkyl) with a branched $C_{3-6}$alkyl group, which is substituted or unsubstituted, and —$NHCONH_2$,
BR is a bridge of the formula -A-B-A- wherein
A is selected from the group consisting of: substituted phenyl, substituted naphthyl, unsubstituted phenyl, and unsubstituted naphthyl, and
B is a bridging sulphon,
the compound of the formula (I) contains 1, 2 or 3 sulpho groups and wherein there are no anionic groups in the bridging member BR.

2. A compound according to claim 1 wherein the compound of the formula (I) contains 2 sulpho groups.

3. A compound according to claim 1 wherein the bridge B is selected from the group consisting of:

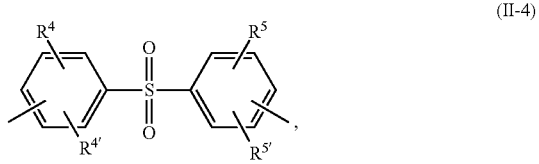

(II-4)

wherein
$R^4$, $R^{4'}$, $R^5$, $R^{5'}$ are independently selected from the group consisting of: hydrogen, unsubstituted unbranched $C_{1-6}$alkyl, unsubstituted branched $C_{3-6}$alkyl, substituted unbranched $C_{1-6}$alkyl, substituted branched $C_{3-6}$alkyl, unsubstituted unbranched $C_{1-6}$alkoxy, unsubstituted branched $C_{3-6}$alkoxy, substituted unbranched $C_{1-6}$alkoxy, substituted branched $C_{3-6}$alkoxl,, halogen, —NHCO—($C_{3-6}$alkyl) with an unbranched $C_{1-6}$alkyl group, which is substituted or unsubstituted, —NHCO—($C_{3-6}$alkyl) with a branched $C_{3-6}$alkyl group, which is substituted or unsubstituted, and —$NHCONH_2$.

4. A process for dyeing and/or printing an organic substrate comprising the step of contacting at least one compound of the formula (I) according to claim 1 with the organic substrate.

5. A process for dyeing and/or printing a substrate comprising wool, silk andor synthetic polyamide comprising the step of contacting at least one compound of formula (I) according to claim 1 with the substrate comprising wool, silk and/or synthetic polyamide.

6. An inkjet printing ink, comprising at least one compound of formula (I) according to claim 1.

7. A printing ink, comprising at least one compound of formula (I) according to claim 1.

* * * * *